United States Patent
Shigetomi et al.

(10) Patent No.: US 9,138,947 B2
(45) Date of Patent: Sep. 22, 2015

(54) METHOD FOR PRODUCING POLARIZER, POLARIZER, POLARIZING PLATE, OPTICAL FILM, AND IMAGE DISPLAY DEVICE

(75) Inventors: Kiyoe Shigetomi, Ibaraki (JP); Kazunori Futamura, Ibaraki (JP); Daisuke Ogomi, Ibaraki (JP); Tetsurou Takeda, Ibaraki (JP); Akinori Nishimura, Ibaraki (JP); Mitsuhiko Tsuji, Ibaraki (JP); Kenrou Murate, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 382 days.

(21) Appl. No.: 12/743,623

(22) PCT Filed: Dec. 4, 2008

(86) PCT No.: PCT/JP2008/072095
§ 371 (c)(1),
(2), (4) Date: May 19, 2010

(87) PCT Pub. No.: WO2009/075225
PCT Pub. Date: Jun. 18, 2009

(65) Prior Publication Data
US 2010/0245727 A1  Sep. 30, 2010

(30) Foreign Application Priority Data

Dec. 13, 2007 (JP) ................................. 2007-322179
Jun. 5, 2008 (JP) ................................. 2008-148385

(51) Int. Cl.
*B05D 3/12* (2006.01)
*B05D 7/04* (2006.01)
(Continued)

(52) U.S. Cl.
CPC .......... *B29D 11/00634* (2013.01); *B29C 55/04* (2013.01); *G02B 5/3033* (2013.01);
(Continued)

(58) Field of Classification Search
CPC ........................... G02B 5/3025; G02B 5/3033
USPC ....................... 427/173, 372.2, 379
See application file for complete search history.

(56) References Cited

U.S. PATENT DOCUMENTS 6,337,369 B1 * 1/2002 Isozaki ........................... 525/61
6,552,763 B1 * 4/2003 Kouya ............................ 349/96
(Continued)

FOREIGN PATENT DOCUMENTS

JP   2000-230016 A   8/2000
JP   2001-151814 A   6/2001
(Continued)

OTHER PUBLICATIONS

Notification of Transmittal of Copies Translation of the International Preliminary Report on Patentability (Form PCT/IB/338) of International Application No. PCT/JP2008/072095 mailed Aug. 19, 2010 with Forms PCT/IB/373 and PCT/ISA/237.
(Continued)

*Primary Examiner* — Michael Wieczorek
(74) *Attorney, Agent, or Firm* — Westerman, Hattori, Daniels & Adrian, LLP

(57) ABSTRACT

A method for producing a polarizer of the present invention includes: subjecting a polyvinyl alcohol film to at least a dyeing process, a crosslinking process and a stretching process, then subjecting the film, in which all of the processes have been performed, having a water content of 25 to 55% by weight to a drying process, wherein in the drying process, the water content of the film is reduced by at least 15% by weight, so that the film has a water content of 5 to 35% by weight, and the drying process has a quick drying stage in which the water content of the film is reduced by at least 10% by weight in a time period of ½ to ⅟₃₀ of the total drying time of the drying process. The polarizer obtained by the production method has durability and has good optical properties over a wide band.

3 Claims, 1 Drawing Sheet

(51) Int. Cl.
   *B29D 11/00* (2006.01)
   *B29C 55/04* (2006.01)
   *G02B 5/30* (2006.01)
   *B29K 29/00* (2006.01)
   *B29K 105/00* (2006.01)
   *B29K 105/24* (2006.01)

(52) U.S. Cl.
   CPC ..... *B29K2029/04* (2013.01); *B29K 2105/0032* (2013.01); *B29K 2105/24* (2013.01); *B29K 2995/0034* (2013.01)

(56) References Cited

U.S. PATENT DOCUMENTS

| | | | | |
|---|---|---|---|---|
| 6,803,115 | B2 * | 10/2004 | Nishida et al. | 428/523 |
| 6,859,241 | B2 * | 2/2005 | Hamamoto et al. | 349/96 |
| 7,188,954 | B2 * | 3/2007 | Suzuki et al. | 353/33 |
| 2003/0133058 | A1 | 7/2003 | Kouya | |
| 2007/0165157 | A1 | 7/2007 | Hong | |
| 2008/0113173 | A1 * | 5/2008 | Hayakawa et al. | 428/220 |

FOREIGN PATENT DOCUMENTS

| | | |
|---|---|---|
| JP | 2002-120326 A | 4/2002 |
| JP | 2002-254544 A | 9/2002 |
| JP | 2003-270440 A | 9/2003 |
| JP | 2004-020631 A | 1/2004 |
| JP | 2004-20631 A | 1/2004 |
| JP | 2004-70296 A | 3/2004 |
| JP | 2005-146084 A | 6/2005 |
| JP | 2006-308938 A | 11/2006 |
| JP | 2007-298540 A | 11/2007 |
| KR | 2007-0076654 A | 7/2007 |
| TW | 1278697 B | 4/2007 |

OTHER PUBLICATIONS

Chinese Office Action dated Oct. 26, 2011, issued in corresponding Chinese Patent Application No. 200880115619.X.

Korean Office Action dated Oct. 24, 2011, issued in corresponding Korean Patent Application No. 10-2010-7012874.

International Search Report of PCT/JP2008/072095, mailing date of Jan. 20, 2009.

Japanese Office Action dated Jun. 28, 2012, issued in corresponding Japanese Patent Application No. 2008-148385, with English translation (4 pages).

Taiwanese Office Action dated Jul. 22, 2013, issued in corresponding Taiwanese Patent Application No. 097148046, w/English translation.

* cited by examiner

METHOD FOR PRODUCING POLARIZER, POLARIZER, POLARIZING PLATE, OPTICAL FILM, AND IMAGE DISPLAY DEVICE

TECHNICAL FIELD

The present invention relates to a method for producing a polarizer and to the polarizer produced by the production method. The present invention also relates to a polarizing plate and an optical film each using the polarizer and to an image display device, such as a liquid crystal display device, an organic electroluminescence (EL) display device and a plasma display panel (PDP), using the polarizer, the polarizing plate or the optical film.

BACKGROUND ART

Liquid crystal displays are used for personal computers, TVs, monitors, cellular phones, PDAs, and so on. Dyed polyvinyl alcohol films have been used for polarizers of liquid crystal displays and so on, because they have a high level of both transmittance and degree of polarization. For example, such polarizers are produced by a process that includes subjecting a polyvinyl alcohol film to each of swelling, dyeing, crosslinking, and stretching processes in a bath, then subjecting the film to a washing process, and then drying the film. Such polarizers are generally used in the form of polarizing plates, which are each composed of a polarizer and a protective film, such as a triacetylcellulose film, bonded to one or both sides of the polarizer with an adhesive.

In recent years, liquid crystal displays have become more sophisticated, and liquid crystal panels are required to have higher contrast such that high visibility can be achieved. Specifically, blacker in black viewing and whiter and brighter in white viewing are desired, and, therefore, further improvement in the polarization performance of polarizers is required. Accordingly, satisfying both high degree of polarization and high transmittance has become very important for polarization performance.

In order to obtain such polarizers, a large number of methods have been proposed. For example, a proposed method for producing polarizers includes subjecting a polyvinyl alcohol film to each of swelling, dyeing, crosslinking, and stretching processes, then subjecting the film to iodide ion treatment as a washing process, and then immersing the film in an alcohol solution (see Patent Literature 1). According to Patent Literature 1, the moisture percentage of polarizers can be reduced without heating, and drying are possible with no degradation in the optical properties of polarizers.

The polarizer is used to form a polarizing plate for liquid crystal displays. Therefore, the polarizer needs to be durable so that its optical properties can resist change even under healing or humidifying conditions. The polarizer also needs to have the initial optical properties over a wide band.

Patent Literature 1: JP-A No. 2003-270440

DISCLOSURE OF INVENTION

Objects to be Solved by the Invention

An object of the present invention is to provide a method for producing a polarizer having durability and having good optical properties over a wide band.

Another object of the present invention is to provide such a polarizer produced by such a production method, a polarizing plate using such a polarizer, and an optical film using such a polarizer. A further object of the present invention is to provide an image display device using such a polarizer, polarizing plate and optical film.

Means for Solving the Problems

As a result of intensive investigations for solving the problems described above, the inventors have found that the objects can be achieved by the polarizer producing method described below and so on, and the present invention has been completed.

The present invention relates to a method for producing a polarizer, including:

subjecting a polyvinyl alcohol film to at least a dyeing process, a crosslinking process and a stretching process, then subjecting the film, in which all of the processes have been performed, having a water content of 25 to 55% by weight to a drying process, wherein in the drying process, the water content of the film is reduced by at least 15% by weight, so that the film has a water content of 5 to 35% by weight, and the drying process has a quick drying stage in which the water content of the film is reduced by at least 10% by weight in a time period of ½ to ⅓₀ of the total drying time of the drying process.

In the method for producing a polarizer, the quick drying stage may be performed by bringing the film into contact with a heating roller.

In the method for producing a polarizer, the quick drying stage is preferably performed from the beginning of the total drying time to ½ to ⅓₀ of the total drying time in the drying process.

In the method for producing a polarizer, the drying temperature is preferably in the range of 40 to 100° C., and the drying temperature of the quick drying stage is preferably 0 to 60° C. higher than the drying temperature of any other drying stage.

The present invention also related to a polarizer produced by the above production method.

The present invention also related to a polarizing plate comprising the above polarizer and a transparent protective film provided on at least one side of the polarizer.

The present invention also related to an optical film comprising a laminate comprising at least one piece of the above polarizer.

The present invention also related to an image display device comprising at least one piece of the above polarizer.

EFFECTS OF THE INVENTION

The method for producing a polarizer of the present invention includes subjecting a polyvinyl alcohol film to a dyeing process, a crosslinking process and a stretching process and then subjecting the resulting film to a drying process. In part of the drying process, quick drying is performed so that the resulting polarizer can have such a level of durability that its optical properties can resist change even under heating or humidifying conditions. It is considered that in a conventional process of drying a polarizer, water is gradually removed from the polarizer, so that the crosslinking component (such as boric acid) in the polarizer may form an insufficiently (loosely) crosslinked product, which may make the molecular chain of polyvinyl alcohol unstable, so that the iodine complex may be allowed to move in the polarizer in the drying process. In contrast, it is considered that since the drying process according to the present invention includes a quick drying stage, the crosslinking component in the polarizer can form a sufficiently crosslinked product in the same state as when it is uniformly infiltrated through the polarizer, so that the molecular chain of polyvinyl alcohol can be stabilized (the Tg of the polyvinyl alcohol film is considered to be raised) and that the iodine complex can be fixed with no movement in the drying process. Thus, it is considered that the production method of the present invention allows stable fixation of the iodine complex to the molecular chain of polyvinyl alcohol, so that a polarizer with good durability can be obtained.

The polarizer obtained by the production method of the present invention has good durability. In such a polarizer, therefore, a change in hue can be kept small even under heating or humidifying conditions. Thus, even when a polarizing plate is obtained by bonding the polarizer of the present invention to a transparent protective film having a low water-vapor permeability of 100 g/m$^2$ or less per 24 hours at 80° C. and 90% R.H., a change in hue can be kept small in the resulting polarizing plate. For example, such a transparent protective film with low water-vapor permeability may be made of a cyclic polyolefin resin, a (meth)acrylic resin, or the like.

When two pieces of the polarizer obtained by the production method of the present invention are arranged so that their absorption axes are perpendicular to each other, the crossed transmittance of the resulting arrangement can be low over a wide band. For example, a polarizer can be obtained that shows a single-piece transmittance (Ts) of 42 to 44% at a measurement wavelength of 550 nm, a crossed transmittance (Tc) of 0.62% or less at a measurement wavelength of 410 nm, and a crossed transmittance (Tc) of 0.85% or less at a measurement wavelength of 700 nm.

DESCRIPTION OF REFERENCE CHARACTERS

Figure 1:
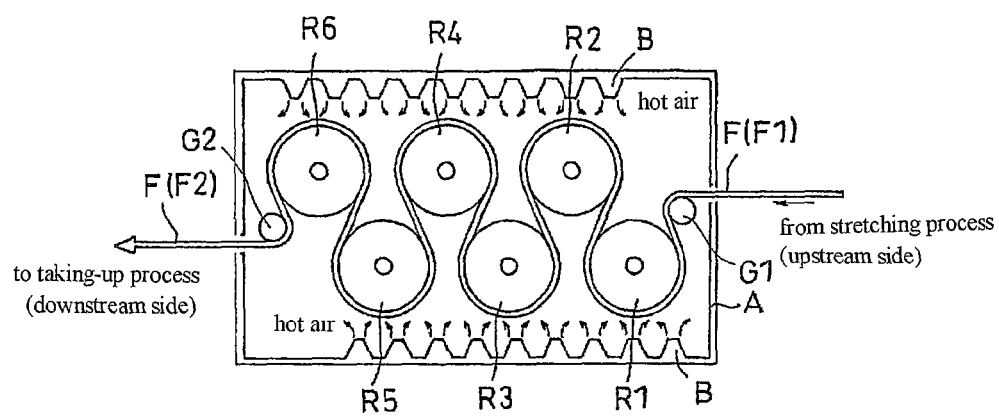
FIG. 1 is a schematic diagram showing an example of a drying process in a method for producing a polarizer of the present invention.

In the drawings, reference character F represents a film, R1 to R6 carry rollers, A an oven, and B a hot air inlet.

BEST MODE FOR CARRYING OUT THE INVENTION

In an embodiment of the present invention, a polyvinyl alcohol film that is optically-transparent in the visible light range and capable of dispersing or adsorbing a dichroic material such as iodine or a dichroic dye is, but not limited to, used for a polarizer. The polyvinyl alcohol film to be used generally has a thickness of about 10 to about 300 μm, preferably of 20 to 100 μm. The polyvinyl alcohol film used as a raw material generally has a width of about 100 to about 5,000 mm.

For example, polyvinyl alcohol films that have been conventionally used for polarizers are preferably used. Examples of materials for the polyvinyl alcohol film include polyvinyl alcohol and derivatives thereof. Examples of polyvinyl alcohol derivatives include polyvinyl formal and polyvinyl acetal and those modified with olefins such as ethylene and propylene, those modified with unsaturated carboxylic acids such as acrylic acid, methacrylic acid and crotonic acid, those modified with alkyl esters of unsaturated carboxylic acids, and those modified with acrylamide or the like. The degree of polymerization of the polyvinyl alcohol is preferably from about 100 to about 10,000, more preferably from 1,000 to 10,000. The degree of saponification of the polyvinyl alcohol is generally from about 80 to about 100% by mole.

Other examples of the polyvinyl alcohol film include hydrophilic polymer films such as partially-saponified ethylene-vinyl acetate copolymer films; and oriented films of polyenes such as dehydration products of polyvinyl alcohol and dehydrochlorination products of polyvinyl chloride.

The polyvinyl alcohol film may also contain an additive such as a plasticizer and a surfactant. Examples of the plasticizer include polyols and condensates thereof, such as glycerol, diglycerol, triglycerol, ethylene glycol, propylene glycol, and polyethylene glycol. The plasticizer is, but not limited to, preferably used at a concentration of 20% by weight or less in the polyvinyl alcohol film.

In an embodiment of the present invention, the polyvinyl alcohol film is subjected to a dyeing process, a crosslinking process and a stretching process.

The dyeing process may be performed by allowing iodine or a dichroic dye to adsorb to and align in the polyvinyl alcohol film. The dyeing process may be performed together with the stretching process. The dyeing is generally performed by immersing the film in a dye solution. The dye solution is generally an iodine solution. For an aqueous iodine solution used as the iodine solution, an aqueous solution in which iodine and iodine ion, which is auxiliary agent, is contained from an iodide compound is used. Examples of the iodide compounds that may be used include potassium iodide, lithium iodide, sodium iodide, zinc iodide, aluminum iodide, lead iodide, copper iodide, barium iodide, calcium iodide, tin iodide, and titanium iodide. The iodide compound is preferably potassium iodide. In an embodiment of the present invention, examples of the iodide compound described above may be also used in other processes.

The concentration of iodine in the iodine solution may be from about 0.01 to about 1% by weight, preferably from 0.02 to 0.5% by weight. The concentration of the iodide compound may be from about 0.1 to about 10% by weight, preferably from 0.2 to 8% by weight. In the iodine dyeing, the temperature of the iodine solution is generally from about 20 to about 50° C., preferably from 25 to 40° C., and the immersion time is generally from about 10 to about 300 seconds, preferably from 20 to 240 seconds.

The crosslinking process is generally performed using a boron compound as a crosslinking agent. The order of crosslinking process may be not limited to perform. The crosslinking process may be performed together with the stretching process. The crosslinking processes may be performed twice or more times. The boron compound may be boric acid, borax or the like. The boron compound is generally used in the form of an aqueous solution or a water-organic solvent mixture solution. An aqueous solution of boric acid is typically used. The concentration of boric acid in the aqueous boric acid solution may be from about 2 to about 15% by weight, preferably from 3 to 13% by weight. In order to provide heat resistance depending on the degree of crosslinkage, the above concentration of boric acid is preferably used. The aqueous boric acid solution or the like may also contain an iodide compound such as potassium iodide, or the like. When the aqueous boric acid solution contains an iodide compound, the concentration of the iodide compound may be from about 0.1 to about 10% by weight, preferably from 0.2 to 5% by weight.

The crosslinking process may be performed by immersing the polyvinyl alcohol film in an aqueous boric acid solution or the like. Alternatively, the boron compound or the like may be applied to the polyvinyl alcohol film by a coating method, a spraying method, or the like. In the crosslinking process, the treatment temperature is generally 25° C. or higher, preferably from 30° C. to 85° C., more preferably from 30° C. to 60° C., and the treatment time is generally from 5 to 800 seconds, preferably from 8 to 500 seconds.

The stretching process is generally performed by uniaxial stretching. The stretching process may be performed together with the dyeing process or the crosslinking process. While the stretching process may use any of a wet stretching method and a dry stretching method, a wet stretching method is preferably used in the present invention. For example, a wet stretching method is typically performed after the dyeing process. Stretching may also be performed together with the crosslinking process. In the case of dry stretching, examples of the stretching method include an inter-roll stretching method, a heated roll stretching method, and a compression stretching method. In the stretching method, the film to be stretched is generally kept in a heated state. The stretching process may also be performed in a multi-stage manner.

The wet stretching method may use a treatment liquid containing an iodide compound. When an iodide compound-containing treatment liquid is used, the concentration of the iodide compound is preferably from about 0.1 to about 10% by weight, more preferably from 0.2 to 5% by weight. In the wet stretching method, the treatment temperature is generally 25° C. or higher, preferably from 30 to 85° C., more preferably from 30 to 60° C., and the immersion time is generally from 10 to 800 seconds, preferably from 30 to 500 seconds.

In the stretching process, the polyvinyl alcohol film may be stretched such that the total stretch ratio reaches 3 to 17, preferably 4 to 10 times, more preferably 4 to 8 times, based on the original length. That is, when stretching is also performed in other processes such as the swelling process described later, the total stretch ratio means the sum total of stretch ratios over the processes. The total stretch ratio may be appropriately determined taking into account the stretch ratio in other processes such as the swelling process so on. If the total stretch ratio is low, the orientation is insufficient so that it can be difficult to obtain a polarizer with a high level of optical properties (a high degree of polarization). On the other hand, if the total stretch ratio is too high, breakage can easily occur during stretching, or the resulting polarizer can be so thin that the workability can be low in the following process.

In the method of the present invention for producing a polarizer, which includes at least the dyeing process, the crosslinking process and the stretching process, a swelling process may be further performed before carrying out the dyeing process. The swelling process is effective in washing dirt or an anti-blocking agent from the surface of the polyvinyl alcohol film. The process of allowing the polyvinyl alcohol film to swell is also effective in preventing unevenness such as uneven dyeing or the like.

For a treatment liquid used in the swelling process, water, distilled water or pure water is generally used. The treatment liquid may contain a small amount of an iodide compound, an additive such as a surfactant, an alcohol, or the like, as long as the treatment liquid is mainly composed of water. When the treatment liquid contains the iodide compound, the concentration of the iodide compound is preferably from about 0.1 to about 10% by weight, more preferably from 0.2 to 5% by weight.

In the swelling process, the treatment temperature is generally adjusted to about 20 to about 45° C., more preferably to 25 to 40° C. When uneven swelling is performed, unevenly swelling portions can result in unevenly dyed portions in the dyeing process, and thus the uneven swelling should be prevented. The immersion time is generally from about 10 to about 300 seconds, preferably from 20 to 240 seconds.

In the swelling process, stretching may be performed as needed. The stretch ratio is generally 6.5 times or less based on the original length of the polyvinyl alcohol film. In view of optical properties, the stretch ratio is preferably from 1.2 to 6.5 times, more preferably from 2 to 4 times, even more preferably 2 to 3 times. By stretching is performed in the swelling process, the stretching in the stretching process performed after the swelling process may be controlled to be small so as not to cause breakage of the film. On the other hand, if the stretch ratio is too high in the swelling process, the stretch ratio is held to be too low in the stretching process, which is not preferred in view of optical properties particularly when the stretching process is performed after the crosslinking process.

In the method of the present invention for producing a polarizer, at least the dyeing process, the crosslinking process and the stretching process are performed, and a metal ion treatment may be further performed in addition to the processes described above. The metal ion treatment may be performed by immersing the polyvinyl alcohol film in an aqueous solution containing a metal salt. The metal ion treatment allows the impregnation of the polyvinyl alcohol film with various metal ions.

Particularly in order to control the color tone or to impart durability, ions of transition metal such as cobalt, nickel, zinc, chromium, aluminum, copper, manganese, or iron are preferably used. From the viewpoints of adjusting the color tone and imparting durability, zinc ions are particularly preferred. Examples of zinc salts include zinc halides such as zinc chloride and zinc iodide, and zinc sulfate and zinc acetate.

The metal ion treatment may use a metal salt solution. Zinc impregnation treatment using an aqueous zinc salt solution is described below as a typical example of the metal ion treatment.

The concentration of zinc ion in the aqueous zinc salt solution may be from about 0.1 to about 10% by weight, preferably from 0.3 to 7% by weight. An aqueous zinc salt solution containing potassium ion and iodide ion derived from potassium iodide or the like is preferably used, because it can facilitate the zinc ion impregnation. The concentration of potassium iodide in the zinc salt solution is preferably from about 0.1 to about 10% by weight, more preferably from 0.2 to 5% by weight.

In the zinc impregnation treatment, the temperature of the zinc salt solution is generally from about 15 to about 85° C., preferably from 25 to 70° C., and the immersion time is generally within the range from about 1 to about 120 seconds, preferably from 3 to 90 seconds. In the zinc impregnation treatment, the conditions such as the concentration of the zinc salt solution and the temperature or time of immersion of the polyvinyl alcohol film in the zinc salt solution may be controlled such that the zinc content of the polyvinyl alcohol film can fall within the range described above. Timing of the zinc impregnation treatment is not particularly limited. The zinc salt may coexist in the dyeing bath, the crosslinking bath or the stretching bath so that the zinc impregnation treatment may be performed simultaneously with the dyeing process, the crosslinking process or the stretching process.

In the method of the present invention for producing a polarizer, the washing process may be performed after at least the dyeing process, the crosslinking process and the stretching process are performed as described above.

The washing process may be performed using a potassium iodide solution. The concentration of potassium iodide in the potassium iodide solution is generally from about 0.5 to about 10% by weight, preferably from 0.5 to 8% by weight, further preferably from 1 to 6% by weight.

In the washing process with the potassium iodide solution, the treatment temperature is generally from about 15 to about 60° C., preferably from 25 to 40° C. The immersion time is generally from about 1 to about 120 seconds, preferably from 3 to 90 seconds. The washing process with the potassium iodide solution may be performed at any stage before the drying process.

The washing process may also include performing a water washing process. The water washing process is generally performed by immersing the polyvinyl alcohol film in pure water such as ion-exchanged water or distilled water. The water washing temperature is generally from 5 to 50° C., preferably from 10 to 45° C., and more preferably from 15 to 40° C. The immersion time is generally from 10 to 300 seconds, preferably from about 20 to about 240 seconds.

The water washing process may be performed in combination with the washing process with the potassium iodide solution. If necessary, the water washing process may be performed using a solution containing a liquid alcohol such as methanol, ethanol, isopropyl alcohol, butanol, or propanol.

After all of the above processes are performed, the drying process is finally performed for the production of a polarizer. The polarizer to be subjected to the drying process has a water content of 25 to 55% by weight. The time of immersion in the treatment bath (aqueous bath) or the like may be controlled in each of the above processes so that the water content can be adjusted to 25 to 55% by weight. Generally, in view of drying efficiency, the film to be subjected to the drying process preferably has a water content of 27 to 52% by weight, or preferably 30 to 50% by weight.

In an embodiment of the present invention, the film having a water content of 25 to 55% by weight is subjected to the drying process, so that the film has a water content of 5 to 35% by weight. In general, the film having been performed the drying process preferably has a water content of 6 to 33% by weight or preferably 8 to 30% by weight, in view of film strength and runnability. The water content of the film having been performed the drying process is at least 15% by weight lower than that before the drying process. The water content is preferably reduced by at least 18% by weight, more preferably at least 20% by weight. The maximum reduction in the water content should be 50% by weight, which is the difference between the maximum water content of the film to be subjected to the drying process, namely, 55% by weight, and the minimum water content of the film having been performed the drying process, namely, 5% by weight.

In an embodiment of the present invention, the drying process described above includes a quick drying stage in which the water content of the film is reduced by at least 10% by weight in a time period of $\frac{1}{2}$ to $\frac{1}{30}$ of the total drying time of the drying process. In the quick drying stage, the water content is preferably reduced by at least 15% by weight, more preferably at least 20% by weight. A stage in which the water content is reduced by less than 10% by weight does not significantly differ from the case where the water content is evenly reduced at each stage in a drying process and can be no longer called "quick drying stage", which makes it hard to produce the effects of the present invention. The quick drying stage is performed for a time period of $\frac{1}{2}$ to $\frac{1}{30}$ of the total drying time of the drying process. The quick drying stage is preferably performed for a time period of $\frac{1}{3}$ to $\frac{1}{28}$, more preferably $\frac{1}{4}$ to $\frac{1}{25}$ of the total drying time of the drying process. If the drying time of the quick drying stage is longer than $\frac{1}{2}$ of the total drying time, drying may proceed too much so that the degradation of the optical properties of the polarizing plate, such as the change of hue, may undesirably occur. On the other hand, if the drying time of the quick drying stage is shorter than $\frac{1}{30}$ of the total drying time, the quick drying stage may be too short to sufficiently reduce the water content, which may make the carrying difficult and is not preferred.

The above respective processes are generally performed in a continuous process, and therefore, the drying process may also be performed in a continuous process after the above processes. In an embodiment of the present invention, for example, the quick drying stage in the drying process may be performed by bringing the film into contact with a heating roller or rollers.

During the drying process, the quick drying stage may be performed at any time, as long as it is performed for a time period of $\frac{1}{2}$ to $\frac{1}{30}$ of the total drying time as described above. Therefore, the quick drying stage may be performed at any of the initial, intermediate and final parts of the total drying time. In view of optical properties, the quick drying stage is preferably performed from the beginning of the total drying time to $\frac{1}{2}$ to $\frac{1}{30}$ of the total drying time in the drying process.

The drying temperature in the drying process is generally set in the range of 40 to 100° C., while it may be any value at which the water content of the film can be controlled to fall within the above range. The drying temperature is preferably from 50 to 90° C., more preferably from 60 to 80° C. In the drying process according to the present invention, the drying temperature of the quick drying stage may be set higher than the drying temperature of any other stage so that quick drying can be achieved. In general, the drying temperature of the quick drying stage is preferably set about 0 to about 60° C. higher, more preferably 3 to 45° C. higher, even more preferably 4 to 30° C. higher than the drying temperature of any drying stage other than the quick drying stage. For example, when the quick drying stage is performed by bringing the film into contact with a heating roller or rollers, the temperature of the heating roller or rollers may be set equal to or higher than the temperature of the drying atmosphere so that the heating roller or rollers can facilitate the drying.

FIG. 1 shows a case where the quick drying stage in the drying process according to the present invention is performed by bringing the film into contact with a heating roller or rollers. Referring to FIG. 1, carry rollers R1 to R6 are provided in series. A guide roller G1 is provided before the carry roller R1 on the upstream side, and a guide roller G2 is provided behind the carry roller R6 on the downstream side. While six carry rollers are provided in FIG. 1, there may be any plural number of carry rollers. In general, the number of carry rollers is preferably from 2 to 40, more preferably from 4 to 30. The number of carry rollers is also preferably an even number so that both sides of the film can be evenly dried. The carry rollers may be provided in a heating furnace such as an oven. In FIG. 1, the carry rollers R1 to R6 provided in series are placed in an oven A, and a plurality of hot air inlets B are provided at inner walls (upper and lower walls) of the oven A so that hot air can be blown to the surface of the film F passing around each carry roller.

In FIG. 1, the film F1 located on the upstream side, which has been performed all of the above processes, has a water content of 25 to 55% by weight, and the film F1 is dried while passing around the carry rollers R1 to R6. The drying process is performed so that the film F2 having passed around the carry roller R6 can have a water content of 5 to 35% by weight. In FIG. 1, for example, any of the carry rollers R1 to R6 may be used as a heating roller(s). In this case, the temperature of the carry rollers R1 to R6 shown in FIG. 1 may be set equal to or higher than the temperature of the drying atmosphere in the drying furnace. Specifically, the temperature of the drying atmosphere in the drying furnace may be from 40 to 100° C., preferably from 50 to 90° C., more preferably from 60 to 80° C., while the temperatures of the carry rollers R1 to R6 are preferably set about 0 to about 60° C. higher, 3 to 45° C. higher, or 4 to 30° C. higher than that of the drying atmosphere in the drying furnace. In this setting, the carry rollers R1 to R6 may be set at the same temperature. When the temperatures of the carry rollers are set in this manner, the quick drying stage is performed on the carry roller R1. Alternatively, the carry roller(s) other than the carry roller R1, namely, at least one of the carry rollers R2 to R6, may be set at a temperature higher than that of the other carry rollers. In this case, the carry roller set at the higher temperature serves as a heating roller to perform the quick drying stage. The high temperature carry roller is preferably set at a temperature about 10 to about 60° C. higher than that of the other carry rollers. In FIG. 1, all or at least one of the carry rollers is used as a heating roller so that the quick drying stage can be performed for a time period of ½ to 1/30 of the total drying time of the drying process.

When the quick drying stage is performed by bringing the film into contact with the heating roller or rollers, the carry rollers R1 to R6 in FIG. 1 may be set at a same temperature equal to or higher than the temperature of the drying atmosphere in the drying furnace, as described above, so that the quick drying stage can be performed at the beginning of the total drying time (e.g., during the time from the beginning to ½ to 1/30 of the total drying time). Alternatively, the carry roller R1 may be set at a temperature higher than that of the other carry rollers. Specifically, when the carry roller R1 is used as a heating roller in FIG. 1, the quick drying stage is provided so that the water content of the film F after passing around the carry roller R1 can be at least 15% by weight lower than that before passing around the carry roller R1. It will be understood that the carry rollers other than the heating roller may be set at room temperature.

The temperature of the heating roller (carry roller) may be measured with a contact type thermometer. The total drying time in the whole of the drying process (the time from the introduction of the film F into the oven A until its removal in FIG. 1) may be controlled by controlling the diameter of the carry rollers, the peripheral speed of the rollers, or the like, taking into account the time of contact of the film (total contact time) with the carry rollers (including the heating roller). The total drying time is generally from 10 to 120 seconds, preferably from 15 to 110 seconds, more preferably from 20 to 100 seconds. The carry rollers generally have a diameter of 200 to 2,000 mm. In general, the rotational speed of the carry rollers is preferably set in the range of 3 to 100 m/minute, more preferably in the range of 6 to 100 m/minute, even more preferably in the range of 10 to 100 m/minute.

When the film F is allowed to pass through the oven A as shown in FIG. 1, air blowing means may be provided together with the heating roller or rollers. In FIG. 1, air is blown from hot air inlets B to the surface of the film F passing around the carry rollers R1 to R6 (at least one of which is a heating roller) in the oven A. The drying temperature in the oven may be controlled by means of the hot air inlets B. In this case, the temperature of the heating roller is set higher than the drying temperature in the oven. The velocity of air from the air blowing means is preferably, but not limited to, 0.5 to 30 m/second, more preferably 1 to 20 m/second. The air blowing means may be provided at one place or two or more places.

For example, the air blowing means to be used may be of a counter flow type. The distance between the film and the air blowing means is preferably from about 10 to about 100 cm, more preferably from 10 to 50 cm. The air velocity is the value in the drying furnace, which may be measured with a mini-vane digital anemometer.

In an embodiment of the present invention, the drying process, which is performed so that the resulting film can have a water content of 5 to 35% by weight, may be followed by a further reduction in the water content. The water content may be further reduced by performing by the same drying process as that according to the present invention or by performing any other conventional drying method (such as hot air drying, natural drying, air blow drying, or drying by heating).

According to conventional techniques, a transparent protective film may be provided on at least one side of the resulting polarizer to form a polarizing plate. A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the transparent protective film can be properly determined and generally in the range of from about 1 to about 500 μm from the viewpoint of a strength, workability such as handlability, requirement for a thin film and the like. Especially, the thickness is preferably in the range of from 1 to 300 μm and more preferably in the range of from 5 to 200 μm. Therefore, it is particularly preferred that the transparent protective film has a thickness of 5 to 150 μm.

Note that in a case where the transparent protective films are provided on both sides of a polarizer, the protective films made from the same polymer may be used on both sides thereof or alternatively, the protective films made from polymer materials different from each other may also be used on respective both sides thereof.

At least one selected from a cellulose resin, a polycarbonate resin, a cyclic polyolefin resin, and a (meth)acrylic resin is preferably used for the transparent protective film according to the present invention.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the present invention are not reduced. Examples of such a (meth)acrylic resin include poly(meth)acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl (meth)acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly($C_{1-6}$ alkyl (meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth)acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by Formula (I):

[Formula 1]

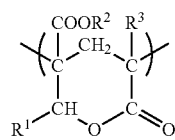

wherein $R^1$, $R^2$ and $R^3$ each independently represent a hydrogen atom or an organic residue of 1 to 20 carbon atoms. The organic residue may contain an oxygen atom(s).

The content of the lactone ring structure represented by Formula (I) in the lactone ring structure-containing (meth)acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula (I) in the lactone ring structure-containing (meth)acrylic resin is less than 5% by weight, its heat resistance, solvent resistance or surface hardness can be insufficient. If the content of the lactone ring structure represented by Formula (I) in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective film to be used generally has an in-plane retardation of less than 40 nm and a thickness direction retardation of less than 80 nm. The in-plane retardation Re is expressed by the formula $Re=(nx-ny) \times d$, the thickness direction retardation Rth is expressed by the formula $Rth=(nx-nz) \times d$, and the Nz coefficient is represented by the formula $Nz=(nx-nz)/(nx-ny)$, where nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Moreover, it is preferable that the transparent protective film may have as little coloring as possible. A protective film having a thickness direction retardation of from −90 nm to +75 nm may be preferably used. Thus, coloring (optical coloring) of polarizing plate resulting from a protective film may mostly be cancelled using a protective film having a thickness direction retardation (Rth) of from −90 nm to +75 nm. The thickness direction retardation (Rth) is preferably from −80 nm to +60 nm, and especially preferably from −70 nm to +45 nm.

Alternatively, the transparent protective film to be used may be a retardation plate having an in-plane retardation of 40 nm or more and/or a thickness direction retardation of 80 nm or more. The in-plane retardation is generally controlled in the range of 40 to 200 nm, and the thickness direction retardation is generally controlled in the range of 80 to 300 nm. The retardation plate for use as the transparent protective film also has the function of the transparent protective film and thus can contribute to a reduction in thickness.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is generally, but not limited to, from about 20 to about 150 μm.

Examples of the polymer material include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resins, cyclic polyolefin resins (norbornene reins), and various types of binary or ternary copolymers thereof, graft copolymers thereof, and any blend thereof. Any of these polymer materials may be formed into an oriented product (a stretched film) by stretching or the like.

Examples of the liquid crystal polymer include various main-chain or side-chain types having a liquid crystal molecular orientation property-imparting conjugated linear atomic group (mesogen) introduced in a main or side chain of a polymer. Examples of the main chain type liquid crystal polymer include polymers having a mesogen group bonded thereto via a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side chain having a mesogen moiety that comprises a nematic orientation-imparting para-substituted cyclic compound unit and is bonded thereto via a spacer moiety comprising a conjugated atomic group. For example, any of these liquid crystal polymers may be applied by a process that includes spreading a solution of the liquid crystalline polymer on an alignment surface such as a rubbed surface of a thin film of polyimide, polyvinyl alcohol or the like, formed on the glass plate, and an obliquely vapor-deposited silicon oxide surface, and heat-treating it.

The retardation plate may have any appropriate retardation depending on the intended use such as compensation for coloration, viewing angle, or the like due to the birefringence of various wave plates or liquid crystal layers. Two or more types of retardation plates may also be laminated to provide controlled optical properties, including retardation.

A retardation plate satisfying the relation: nx=ny>nz, nx>ny>nz, nx>ny=nz, nx>nz>ny, nz=nx>ny, nz>nx>ny, or nz>nx=ny may be selected and used depending on various applications. The relation ny=nz includes not only the case where ny is completely equal to nz but also the case where ny is substantially equal to nz.

For example, the retardation plate satisfying the relation nx>ny>nz to be used preferably has an in-plane retardation of 40 to 100 nm, a thickness retardation of 100 to 320 nm, and an Nz coefficient of 1.8 to 4.5. For example, the retardation plate satisfying the relation nx>ny=nz (positive A plate) to be used preferably has an in-plane retardation of 100 to 200 nm. For example, the retardation plate satisfying the relation nz=nx>ny (negative A plate) to be used preferably has an in-plane retardation of 100 to 200 nm. For example, the retardation plate satisfying the relation nx>nz>ny to be used preferably has an in-plane retardation of 150 to 300 nm and an Nz coefficient of more than 0 and not more than 0.7. As described above, for example, the retardation plate satisfying the relation nx=ny>nz, nz>nx>ny or nz>nx=ny may also be used.

The transparent protective film may be appropriately selected depending on the liquid crystal display to be produced therewith. In the case of VA (Vertical Alignment, including MVA and PVA), it is preferred that the transparent protective film on at least one side of the polarizing plate (on the cell side) has a retardation. Specifically, it preferably has a retardation Re in the range of 0 to 240 nm and a retardation Rth in the range of 0 to 500 nm. In terms of three-dimensional refractive index, the case of nx>ny=nz, nx>ny>nz, nx>nz>ny, or nx=ny>nz (positive A-plate, biaxial, negative C-plate) is preferred. In VA mode, a combination of positive A-plate and negative C-plate or single use of biaxial film is preferably used. When polarizing plates are used on upper and lower sides of a liquid crystal cell, the transparent protective films may have a retardation on upper and lower sides of the liquid crystal cell, or one of the upper and lower transparent protective films may has a retardation.

For example, in the case of IPS (In-Plane Switching, including FFS), the transparent protective film for use in one of the polarizing plates may have or may not have a retardation. For example, a transparent protective film with no retardation is preferably provided on both upper and lower sides of a liquid crystal cell (cell sides), or otherwise a transparent protective film with a retardation is preferably provided on both or one of the upper and lower sides of a liquid crystal cell (for example, Z conversion on the upper side with no retardation on the lower side or an A-plate provided on the upper side with a positive C-plate provided on the lower side). When it has a retardation, it preferably has a retardation Re in the range of −500 to 500 nm and a retardation Rth in the range of −500 to 500 nm. In terms of three-dimensional refractive index, nx>ny=nz, nx>nz>ny, nz>nx=ny, or nz>nx>ny (positive A-plate, biaxial, negative C-plate) is preferred.

The film with retardation may be separately prepared and laminated to a transparent protective film with no retardation so that the function described above can be provided.

The transparent protective film may be subjected to surface modification treatment before it is applied with the adhesive. Specific examples of such treatment include corona treatment, plasma treatment, primer treatment, saponification treatment, and coupling agent treatment.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer, for example a diffusing plate of the backlight side.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

The polarizer may be bonded to the transparent protective film with an adhesive. Examples of such an adhesive include isocyanate adhesives, polyvinyl alcohol adhesives, gelatin adhesives, vinyl latexes, and aqueous polyesters. The adhesive is generally used in the form of an aqueous solution, which generally has a solids content of 0.5 to 60% by weight. Besides the above, an active energy ray-curable adhesive such as an ultraviolet-curable adhesive or an electron beam-curable adhesive may also be used as the adhesive to bond the polarizer to the transparent protective film. Electron beam-curable adhesives for polarizing plates exhibit good adhesion to the transparent protective film, especially to acrylic resins. In the adhesive used in the present invention may contain a metal compound filler.

The polarizing plate of the present invention is produced by bonding the transparent protective film to the polarizer with the adhesive. The adhesive may be applied to either or both of the transparent protective film and the polarizer. The lamination may be followed by the drying process so that the adhesive layer may be formed as a dried coating layer. The lamination of the polarizer and the transparent protective film may be performed using a roll laminator or the like. The thickness of the adhesive layer is generally, but not limited to, from about 30 to about 1,000 nm.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a, reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective film etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

A description of the elliptically polarizing plate or circularly polarizing plate in which the retardation plate is laminated to the polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyarylates and polyamides; aligned films comprising liquid crystal materials, such as liquid crystal polymer; and films on which an alignment layer of a liquid crystal material is supported may be mentioned. A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate includes, for example, a retardation plate, an oriented film made of liquid crystal polymers or the likes, and an oriented layer made of liquid crystal polymers or the likes provided on a substrate. Ordinary used retardation plate is a polymer film having birefringence property processed by uniaxial stretching in plane, while a retardation plate used as the viewing angle compensation is a polymer film having birefringence property processed by biaxial stretching in plane, a film having birefringence property, which is controlled in thickness direction index, processed by uniaxial stretching in plane and out of plane, or a biaxial stretched film as inclined alignment film etc. As inclined alignment film, for example, a film obtained using a method in which a heat shrinking film is adhered to a polymer film, and then the combined film is heated and stretched or shrunk under a condition of being influenced by a shrinking force, or a film that is aligned in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, a pressure-sensitive adhesive layer may also be prepared for adhesion with other members, such as a liquid crystal cell etc. As pressure-sensitive adhesive that forms pressure-sensitive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

Moreover, a pressure-sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure-sensitive adhesive layer may contain additives, for example, such as natural or synthetic resins, adhesive resins, glass fibers, glass beads, metal powder, fillers comprising other inorganic powder etc., pigments, colorants and antioxidants. Moreover, it may be a pressure-sensitive adhesive layer that contains fine particle and shows optical diffusion nature.

Proper method may be carried out to attach a pressure-sensitive adhesive layer to one side or both sides of the optical film. As an example, about 10 to about 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which a pressure-sensitive adhesive layer is once formed on a separator, as mentioned above, and is then transferred on a polarizing plate or an optical film may be mentioned.

A pressure-sensitive adhesive layer may also be prepared on one side or both sides of a polarizing plate or an optical film as a layer in which pressure-sensitive adhesives with different composition or different kind etc. are laminated together. Moreover, when pressure-sensitive adhesive layers are prepared on both sides, pressure-sensitive adhesive layers that have different compositions, different kinds or thickness, etc. may also be used on front side and backside of a polarizing plate or an optical film. Thickness of a pressure-sensitive adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and a pressure-sensitive adhesive layer, using a method of adding UV absorbents, such as salicylic acid ester type compounds, benzophenol type compounds, benzotriazol type compounds, cyano acrylate type compounds, and nickel complex salt type compounds.

A polarizing plate or an optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, polarizing plates or optical films and, if necessity, lighting system, and by incorporating driving circuit. In the present invention, except that a polarizing plate or an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned polarizing plate or optical film has been located at one side or both sides of the liquid crystal cell, and with which a backlight or a reflector is used for a lighting system may be manufactured. In this case, the polarizing plate or optical film by the present invention may be installed in one side or both sides of the liquid crystal cell. When installing the polarizing plate or optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

EXAMPLES

The present invention is more specifically described below using some examples and comparative examples.

Example 1

A 75 μm-thick polyvinyl alcohol film (2,400 in average degree of polymerization and 99.9% by mole in degree of saponification) was used as a raw film. The polyvinyl alcohol film was subjected to the respective processes in the order described below.
(Swelling Process)
Pure water was used as a treatment liquid in the swelling bath. The polyvinyl alcohol film was transferred to the swelling bath and immersed for 30 seconds in the pure water adjusted to 30° C. so that it was allowed to swell.
(Dyeing Process)
A 0.3% by weight iodine dyeing solution containing iodine and potassium iodide (0.5:8 in weight ratio) was used as a treatment liquid in the dyeing bath. After the swelling treatment, the polyvinyl alcohol film was transferred to the dyeing bath and immersed for 30 seconds in the iodine dyeing solution adjusted to 30° C., while it was uniaxially stretched to 3.3 times (stretch ratio) based on the original length, so that the film was dyed.
(Crosslinking Process)
An aqueous boric acid solution containing 3% by weight of boric acid and 3% by weight of potassium iodide was used as a treatment liquid in the crosslinking bath. After the treatment described above, the polyvinyl alcohol film was transferred to the crosslinking bath and immersed for 30 seconds in the aqueous boric acid solution adjusted to 30° C., while it was uniaxially stretched such that the total stretch ratio reached 3.6 times based on the original length.
(Stretching Process)
An aqueous boric acid solution containing 4% by weight of boric acid and 5% by weight of potassium iodide was used as a treatment liquid in the stretching bath. After the treatment described above, the polyvinyl alcohol film was transferred to the stretching bath and immersed for 60 seconds in the aqueous boric acid solution adjusted to 60° C., while it was uniaxially stretched such that the total stretch ratio reached 6 times based on the original length.
(Washing Process)
An aqueous solution containing 3% by weight of potassium iodide was used as a treatment liquid for the washing bath. The polyvinyl alcohol film treated as described above was transferred to the washing bath and immersed in the aqueous solution, which was adjusted to 30° C., for 10 seconds. After the washing process, the resulting film had a water content of 32% by weight
(Drying Process)
The above treated polyvinyl alcohol film was then dried using the apparatus (oven) shown in FIG. 1. Six carry rollers (500 mm in roller diameter, 6 m/minute in peripheral speed) were alternately arranged up and down as shown in FIG. 1. The first carry roller from the upstream side (R1 in FIG. 1) was set at a temperature of 70° C. and used as a heating roller. The other five carry rollers (R2 to R6 in FIG. 1) were also set at a temperature of 70° C. Air with a temperature of 70° C. was blown at a velocity of 19 m/second from the air blowing means into the oven. The temperature in the oven was 66° C. That is, the temperature of the heating roller (R1) was set 4° C. higher than the temperature in the oven. The total drying time of the drying process was 89 seconds, and the time of drying on the heating roller (R1) was 11 seconds (⅛ of the total drying time).

The film had the water content shown below after passing around each of six carry rollers (the first roller was used as a heating roller). The film had:
a water content of 32% by weight before passing around the first carry roller R1 (heating roller);
a water content of 19% by weight between the first and second carry rollers R1 and R2;
a water content of 17% by weight between the second and third carry rollers R2 and R3;
a water content of 16% by weight between the third and fourth carry rollers R3 and R4;
a water content of 15% by weight between the fourth and fifth carry rollers R4 and R5;
a water content of 15% by weight between the fifth and sixth carry rollers R5 and R6; and
a water content of 14% by weight after passing around the sixth carry roller R6.

Example 2

Swelling Process to Washing Process

The same polyvinyl alcohol film was used as in Example 1. A polyvinyl alcohol film with a water content of 42% by weight was obtained by performing each process as in Example 1, except that in the process from the swelling process to the washing process, the immersion time in the dyeing process was changed to 15 seconds, the boric acid concentration of the aqueous boric acid solution and the immersion time in the crosslinking process were changed to 5% by weight and 15 seconds, respectively, the immersion time in the stretching process was changed to 30 seconds, and the immersion time in the washing process was changed to 5 seconds.

(Drying Process)

The treated polyvinyl alcohol film was then dried as in Example 1 using the apparatus (oven) shown in FIG. 1, except that the peripheral speed of the carry rollers was changed to 15 m/minute. The total drying time of the drying process was 36 seconds, and the time of drying on the heating roller (R1) was 4 seconds (1/9 of the total drying time).

The film had the water content shown below after passing around each of six carry rollers (the first roller was used as a heating roller). The film had:

a water content of 42% by weight before passing around the first carry roller R1 (heating roller);

a water content of 22% by weight between the first and second carry rollers R1 and R2;

a water content of 16% by weight between the second and third carry rollers R2 and R3;

a water content of 16% by weight between the third and fourth carry rollers R3 and R4;

a water content of 16% by weight between the fourth and fifth carry rollers R4 and R5;

a water content of 16% by weight between the fifth and sixth carry rollers R5 and R6; and a water content of 16% by weight after passing around the sixth carry roller R6.

Comparative Example 1

Figure 2:
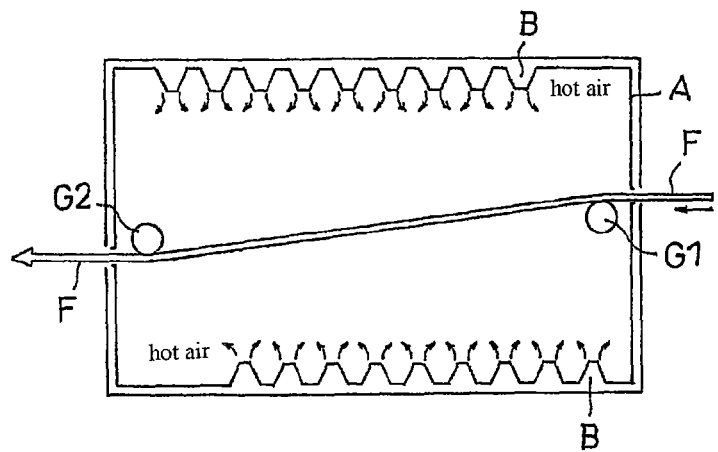
FIG. 2 is a schematic diagram showing a drying process used in comparative examples.

A polarizer was obtained as in Example 1, except that the drying process was performed using the apparatus shown in FIG. 2 (which had the same configuration as the apparatus shown in FIG. 1, except that no carry roller was placed) in which the temperature in the oven was 66° C., the total drying time in the oven was 30.5 seconds, and the carry speed was 6 m/minute. The film had a water content of 32% by weight before the drying process and a water content of 19% by weight after the drying process.

The film had the water content shown below after each transit time in the oven apparatus (the total drying time was 30.5 seconds). The film had:

a water content of 32% by weight before it was introduced into the oven;

a water content of 24% by weight after a transit time of 3.8 seconds;

a water content of 23% by weight after a transit time of 11.4 seconds;

a water content of 22.5% by weight after a transit time of 15.25 seconds (½ of the total drying time);

a water content of 22% by weight after a transit time of 19.0 seconds;

a water content of 20% by weight after a transit time of 26.7 seconds; and a water content of 19% by weight after a transit time of 30.5 seconds (after it passed through the oven apparatus).

Comparative Example 2

A polarizer was obtained as in Example 2, except that the drying process was performed using the apparatus shown in FIG. 2 (which had the same configuration as the apparatus shown in FIG. 1, except that no carry roller was placed) in which the temperature in the oven was 66° C., the total drying time in the oven was 12.2 seconds, and the carry speed was 15 m/minute. The film had a water content of 42% by weight before the drying process and a water content of 29% by weight after the drying process.

The film had the water content shown below after each transit time in the oven apparatus (the total drying time was 12.2 seconds). The film had:

a water content of 42% by weight before it was introduced into the oven;

a water content of 35% by weight after a transit time of 1.5 seconds;

a water content of 33% by weight after a transit time of 4.6 seconds;

a water content of 32.6% by weight after a transit time of 6.1 seconds (½ of the total drying time);

a water content of 32% by weight after a transit time of 7.6 seconds;

a water content of 30% by weight after a transit time of 10.7 seconds; and a water content of 29% by weight after a transit time of 12.2 seconds (after it passed through the oven apparatus).

The water content of the film in each example was determined by sampling the film from the measurement portion, completely drying the sample at 120° C. and measuring the weight before and after the drying. In each Example, the measurement portion was immediately behind each carry roller.

A polarizing plate was prepared as described below using the polarizer obtained in each of the examples and the comparative examples.

(Transparent Protective Film)

(1) An 80 μm thick triacetylcellulose film (450 g/m² per 24 hours in water-vapor permeability) was used.

(2) A 70 μm thick, lactone ring structure-containing acrylic resin film (90 g/m² per 24 hours in water-vapor permeability) was also used as described below.

The water-vapor permeability was measured according to the water-vapor permeability test (cup method) of JIS Z 0208. A sample with a diameter of 60 mm obtained by cutting was placed in a water vapor-permeable cup containing about 15 g of calcium chloride. The cup was placed in a thermostat at 80° C. and 90% and allowed to stand for 24 hours. The water-vapor permeability (g/m² per 24 hours) was determined by measuring the increase in the weight of the calcium chloride from before to after the standing.

(Preparation of Adhesive)

An aqueous adhesive solution was prepared by a process including dissolving 100 parts by weight of an acetoacetyl group-containing polyvinyl alcohol resin (1,200 in average degree of polymerization, 98.5% by mole in degree of saponification, 5% by mole in degree of acetoacetylation) and 32 parts by weight of methylol melamine in pure water under the conditions of a temperature of 30° C. and adjusting the solids content to 3.2%.

(Preparation of Polarizing Plate)

The transparent protective film was bonded to both sides of the polarizer using the adhesive under the conditions of a temperature of 30° C. in a roller laminator. Thereafter, the laminate was dried at 60° C. for 4 minutes to obtain a polarizing plate.

The resulting polarizers and polarizing plates were evaluated as described below.

<Perpendicular Band>

The single-piece transmittance (Ts) and the crossed transmittance (Tc) of the polarizer were measured with an integrating sphere-equipped spectrophotometer (V7100 manufactured by JASCO Corporation). In the measurement of the transmittance for each linearly polarized light, the transmittance for completely polarized light obtained through a Glan-Taylor prism polarizer was normalized as 100%. The single-piece transmittance (Ts) was measured at a wavelength of 550 nm, and the crossed transmittance (Tc) was measured at wavelengths of 410 nm and 700 nm. The results are shown in Table 1.

TABLE 1

|  | Measurement wavelength: 550 nm Ts | Measurement wavelength: 410 nm Tc | Measurement wavelength: 700 nm Tc |
| --- | --- | --- | --- |
| Example 1 | 43.9 | 0.51 | 0.66 |
| Comparative Example 1 | 44.0 | 0.73 | 1.64 |
| Example 2 | 44.0 | 0.62 | 0.82 |
| Comparative Example 2 | 44.0 | 0.72 | 1.44 |

It is apparent from Table 1 that the polarizer according to the present invention has a low crossed transmittance (Tc) over a wide band including wavelengths of 410 nm and 700 nm.

<Chromaticity>

The same two polarizing plates (with respect to only Example 1 and Comparative Example 1) were used. The chromaticity of an arrangement in which the two polarizing plates were perpendicular (the crossed a value (crossed a) and the crossed b value (crossed b)) and the chromaticity of another arrangement in which the two polarizing plates were parallel (the parallel a value (parallel a) and the parallel b value (parallel b)) were determined using an integrating sphere-equipped spectrophotometer (V7100 manufactured by JASCO Corporation). The a and b values are those of the Hunter Lab color system. The results are shown in Table 2.

TABLE 2

|  | Protective film type | Crossed a | Crossed b | Parallel a | Parallel b |
| --- | --- | --- | --- | --- | --- |
| Example 1 | (1) | −0.12631 | 0.53133 | −0.33991 | 0.62726 |
|  | (2) | −0.06269 | 0.33082 | −0.17058 | 0.48871 |
| Comparative Example 1 | (1) | −0.23563 | 0.68592 | −0.36723 | 0.75449 |
|  | (2) | −0.29990 | −0.50945 | −0.37888 | 0.66819 |

It is apparent from Table 2 that the polarizer according to the present invention can form a polarizing plate with good chromaticity even when used in combination with a transparent protective film with low water-vapor permeability.

<Optical Properties>

Table 3 shows changes in the optical properties of the resulting polarizing plate before and after the standing under durability test conditions. The heat resistance was tested by allowing the polarizing plate to stand under heating conditions at a temperature of 90° C. for 250 hours. The humidity resistance was tested by allowing the polarizing plate to stand under wet heat conditions at a temperature of 60° C. and a humidity of 95% for 250 hours. Concerning the optical properties, the single-piece transmittance (Ts), the degree (P) of polarization and the crossed a value (crossed a) were measured using an integrating sphere-equipped spectrophotometer (V7100 manufactured by JASCO Corporation), and the amount (Δ) of change in each measurement before and after the durability test was indicated. The measurement was performed at a wavelength of 550 nm. The degree (P) of polarization was calculated by substituting, into the formula below, the transmittance (parallel transmittance $H_0$) of a laminate of the same two polarizing plates with their transmission axes parallel to each other and the transmittance (crossed transmittance $H_{90}$) of a laminate of the same two polarizing plates with their transmission axes perpendicular to each other.

$$\text{Degree of polarization}(\%) = \{(H_0 - H_{90})/(H_0 + H_{90})\}^{1/2} \times 100.$$

Each transmittance was represented by a Y value which had been performed luminosity correction in the two-degree visual field (C illuminant) according to JIS Z 8701, and the transmittance for completely polarized light obtained through a Glan-Taylor prism polarizer was normalized as 100%.

TABLE 3

|  | Protective film type | Heating | | | | Humidifying | | | |
| --- | --- | --- | --- | --- | --- | --- | --- | --- | --- |
|  |  | ΔTs | ΔP | Δ crossed a | Δ crossed b | ΔTs | ΔP | Δ crossed a | Δ crossed b |
| Example 1 | (1) | 0.710 | −0.950 | 3.509 | 5.894 | 0.647 | −0.289 | −0.471 | −3.754 |
|  | (2) | 0.485 | −0.580 | 2.626 | 5.234 | 0.431 | −0.031 | −0.089 | 0.534 |
| Comparative Example 1 | (1) | 1.056 | −2.013 | 5.188 | 6.975 | 1.185 | −1.029 | −1.828 | −5.257 |
|  | (2) | 0.816 | −1.670 | 4.281 | 7.470 | 0.629 | −0.208 | −0.152 | 0.779 |
| Example 2 | (1) | 0.733 | −0.961 | 4.879 | 5.171 | 0.843 | −0.317 | −0.811 | −2.120 |
|  | (2) | 0.532 | −0.785 | 4.458 | 5.080 | 0.292 | −0.108 | −0.524 | 0.303 |
| Comparative Example 2 | (1) | 1.155 | −1.904 | 6.602 | 6.613 | 1.003 | −0.603 | −1.452 | −2.817 |
|  | (2) | 0.638 | −1.283 | 5.309 | 5.381 | 0.441 | −0.156 | −0.591 | −0.843 |

It is apparent from Table 3 that the polarizing plate according to the present invention shows a small amount of change and has good durability, even when placed under healing or humidifying conditions and even when used in combination with a transparent protective film with a low water-vapor permeability in the preparation of a polarizing plate.

The invention claimed is:

1. A method for producing a polarizer, comprising:
subjecting a polyvinyl alcohol film to at least a dyeing process, a crosslinking process and a stretching process, then subjecting the polyvinyl alcohol film, in which all of the processes have been performed, having a water content of 25 to 55% by weight to a drying process, wherein the dyeing process is performed by allowing iodine to adsorb to and align in the polyvinyl alcohol film, in the drying process, the water content of the polyvinyl alcohol film is reduced by at least 15% by weight, so that the polyvinyl alcohol film has a water content of 5 to 35% by weight, and the drying process comprises bringing the polyvinyl alcohol film into contact with a heating roller and blowing hot air, thereby performing a quick drying stage in which the water content of the polyvinyl alcohol film is reduced by at least 10% by weight in a time period of ½ to ⅟₃₀ of the total drying time of the drying process.

2. The method for producing a polarizer according to claim 1, wherein the quick drying stage is performed from the beginning of the total drying time to ½ to ⅟₃₀ of the total drying time in the drying process.

3. The method for producing a polarizer according to claim 1, wherein the drying temperature is in the range of 40 to 100° C., and the drying temperature of the quick drying stage is 0 to 60° C. higher than the drying temperature of any other drying stage.

* * * * *